(12) United States Patent
Wallace et al.

(10) Patent No.: US 12,461,261 B2
(45) Date of Patent: Nov. 4, 2025

(54) TUNNELING AND NAVIGATION SYSTEM INCLUDING DISTRIBUTED COMMUNICATION AND SENSING SYSTEM

(71) Applicant: GE VERNOVA INFRASTRUCTURE TECHNOLOGY, Greenville, SC (US)

(72) Inventors: Kirk D. Wallace, Glenville, NY (US); Emad A. Andarawis, Ballston Lake, NY (US); Deepak Trivedi, Halfmoon, NY (US); Brian J. Scherer, Schenectady, NY (US)

(73) Assignee: GE VERNOVA INFRASTRUCTURE TECHNOLOGY, Greenville, SC (US)

( * ) Notice: Subject to any disclaimer, the term of this patent is extended or adjusted under 35 U.S.C. 154(b) by 150 days.

(21) Appl. No.: 17/981,981

(22) Filed: Nov. 7, 2022

(65) Prior Publication Data

US 2024/0151864 A1 May 9, 2024

(51) Int. Cl.
*G01V 1/16* (2006.01)
*G01N 29/06* (2006.01)
(Continued)

(52) U.S. Cl.
CPC ......... *G01V 1/162* (2013.01); *G01N 29/0654* (2013.01); *G01V 1/18* (2013.01); *G01V 3/12* (2013.01)

(58) Field of Classification Search
CPC ... G01V 1/42; G01V 3/30; G01V 1/18; G01V 1/162; G01V 3/12; G01V 2210/62;
(Continued)

(56) References Cited

U.S. PATENT DOCUMENTS 3,525,111 A 8/1970 Von Arx
4,475,260 A 10/1984 Beck
(Continued)

FOREIGN PATENT DOCUMENTS

CN 103197675 B 5/2016
CN 106437703 A 2/2017
(Continued)

OTHER PUBLICATIONS

Tsujimura et al., "Electromagnetic navigation system for underground tunneling robot", 1999 IEEE International Conference on Systems, Man, and Cybernetics, Oct. 12, 1999, pp. 830-835, 4.
(Continued)

*Primary Examiner* — Daniel L Murphy
*Assistant Examiner* — Amie M Ndure
(74) *Attorney, Agent, or Firm* — Buckley, Maschoff & Talwalkar LLC (57) ABSTRACT

A system includes a tunneling device including a body assembly configured to move through an interior cavity of a tunnel. The system also includes a distributed communication and sensing system and a controller. The distributed communication and sensing system includes a first beacon coupled to the body assembly, and a second beacon positioned outside of the tunnel. The second beacon is communicatively coupled to the first beacon. The controller is configured to compare a first signal transmitted by the first beacon to a second signal transmitted by the second beacon, determine an environmental characteristic of the tunnel based on the first signal and the second signal, and determine an operating parameter for the tunneling device based on the environmental characteristic.

17 Claims, 3 Drawing Sheets

(51) Int. Cl.
*G01V 1/18* (2006.01)
*G01V 3/12* (2006.01)

(58) Field of Classification Search
CPC ........ G01V 2210/6222; G01N 29/0654; E21B 47/14; E21B 47/0232; E21B 44/005; E21B 47/13; E21B 49/00
USPC ...................................................... 367/188
See application file for complete search history.

(56) References Cited

U.S. PATENT DOCUMENTS

| | | | |
|---|---|---|---|
| 5,423,630 A | 6/1995 | Imoto et al. | |
| 6,107,795 A | 8/2000 | Smart | |
| 6,161,630 A * | 12/2000 | Stump | G01S 13/86 324/333 |
| 6,371,631 B1 | 4/2002 | Reutemann | |
| 6,514,346 B1 | 2/2003 | Nichols | |
| 6,959,772 B2 | 11/2005 | Stegmaier et al. | |
| 7,210,364 B2 | 5/2007 | Ghorbel et al. | |
| 7,812,328 B2 | 10/2010 | Betz | |
| 9,351,106 B2 * | 5/2016 | Markham | H04W 4/02 |
| 2003/0039752 A1 | 2/2003 | Winiewicz et al. | |
| 2004/0112595 A1 * | 6/2004 | Bostick, III | E21B 47/06 166/250.01 |
| 2004/0129424 A1 * | 7/2004 | Hosie | E21B 21/08 175/25 |
| 2005/0178558 A1 * | 8/2005 | Kolle | G01V 1/40 166/321 |
| 2006/0185899 A1 | 8/2006 | Alft et al. | |
| 2008/0245570 A1 * | 10/2008 | Partouche | E21B 49/10 175/48 |
| 2009/0025926 A1 * | 1/2009 | Briquet | E21B 49/10 166/242.6 |
| 2013/0133882 A1 * | 5/2013 | Harms | E21B 49/10 166/250.01 |
| 2015/0122478 A1 * | 5/2015 | Partouche | E21B 17/18 166/242.6 |
| 2015/0253418 A1 * | 9/2015 | Poedjono | G01S 11/14 367/129 |
| 2015/0275605 A1 * | 10/2015 | Bennett | E21B 10/32 166/55.1 |
| 2018/0163513 A1 * | 6/2018 | Cozon | B66D 1/28 |
| 2020/0271809 A1 * | 8/2020 | Al-Ali | E21B 47/14 |
| 2021/0025533 A1 | 1/2021 | Duncan et al. | |
| 2021/0025534 A1 | 1/2021 | Duncan et al. | |
| 2021/0025535 A1 | 1/2021 | Duncan et al. | |
| 2021/0025536 A1 | 1/2021 | Duncan et al. | |

FOREIGN PATENT DOCUMENTS

| | | | | |
|---|---|---|---|---|
| CN | 111412911 A | | 7/2020 | |
| CN | 112378399 A | | 2/2021 | |
| CN | 106781370 B | | 3/2021 | |
| CN | 112012756 B | | 3/2022 | |
| WO | WO-2015100484 A1 * | | 7/2015 | ............. E21B 10/00 |

OTHER PUBLICATIONS

Cao et al., "Kinematics simulation of environmental parameter monitor robot used in coalmine underground", 2016 13th International Conference on Ubiquitous Robots and Ambient Intelligence (URAI), Aug. 19, 2016, pp. 576-581.

* cited by examiner

TUNNELING AND NAVIGATION SYSTEM INCLUDING DISTRIBUTED COMMUNICATION AND SENSING SYSTEM

STATEMENT REGARDING FEDERALLY SPONSORED RESEARCH AND DEVELOPMENT

This invention was made with Government support under contract number D19AC00018 awarded by the Defense Advanced Research Projects Agency (DARPA). The Government has certain rights in this invention.

BACKGROUND

The field of the disclosure relates to tunneling and navigation systems, and more particularly to tunneling and navigation systems including a distributed communication and sensing system and a controller that determines operating parameters and/or environmental characteristics based on signals provided by the distributed communication and sensing system.

Tunneling devices are used to travel through underground locations and displace material to form and shape tunnels through the underground locations. At least some tunneling devices include a drive system to propel the tunneling devices through underground locations. In addition, a tool may be positioned at the front of the tunneling devices to displace material and form an interior cavity of the tunnel as the tunneling devices travel through the underground locations. However, the underground locations may have varying conditions and obstacles that make travel and access difficult. In addition, environmental characteristics of the underground locations may affect travel of the tunneling devices. The tunneling devices may have limited ability to detect characteristics of the environment and/or objects within the underground location and, thus, the tunneling device may encounter materials, conditions, and objects that hinder or slow travel of the tunneling device. Moreover, communication between the tunneling device and other systems may be limited because the tunneling device and/or the systems are not configured for a robust exchange of information within or outside the underground location.

Accordingly, it is desirable to provide a system including a distributed communication and sensing system and a controller that determines operating parameters and/or environmental characteristics of an underground location.

BRIEF DESCRIPTION

In one aspect, a system includes a tunneling device including a body assembly configured to move through an interior cavity of a tunnel. The system also includes a distributed communication and sensing system and a controller. The distributed communication and sensing system includes a first beacon coupled to the body assembly, and a second beacon positioned outside of the tunnel. The second beacon is communicatively coupled to the first beacon. The controller is configured to compare a first signal transmitted by the first beacon to a second signal transmitted by the second beacon, determine an environmental characteristic of the tunnel based on the first signal and the second signal, and determine an operating parameter for the tunneling device based on the environmental characteristic.

In another aspect, a tunneling device is provided. The tunneling device includes a body assembly configured to move through an interior cavity of a tunnel, a first beacon coupled to the body assembly and communicatively coupled to a second beacon positioned outside of the tunnel, and a controller communicatively coupled to the first beacon. The controller is configured to compare a first signal transmitted by the first beacon to a second signal transmitted by the second beacon, determine an environmental characteristic of the tunnel based on the first signal and the second signal, and determine an operating parameter for said tunneling device based on the environmental characteristic.

In yet another aspect, a method includes positioning a tunneling device within an interior cavity of a tunnel. The tunneling device includes a body assembly configured to move through the interior cavity of the tunnel. The method also includes transmitting a first signal from a first beacon coupled to the body assembly to a second beacon positioned outside of the tunnel, transmitting a second signal from the second beacon to the first beacon, and comparing, by a controller, the first signal to the second signal. The method further includes determining, by the controller, an environmental characteristic of the tunnel based on the first signal and the second signal, and determining, by the controller, an operating parameter for the tunneling device based on the environmental characteristic.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to a system including a tunneling device and a distributed communication and sensing system. The tunneling device includes a body assembly configured to move through an interior cavity of a tunnel. The distributed communication and sensing system includes a first beacon coupled to the body assembly and a second beacon positioned outside of the tunnel. The second beacon is communicatively coupled to the first beacon. For example, the first beacon and the second beacon are each configured to transmit and receive signals to and from each other. Accordingly, the first beacon and the second beacon are configured to act as disbursed communication elements of the distributed communication and sensing system and share and exchange information to facilitate characterization of the environment around and between the beacons and/or the tunneling device. For example, a controller is configured to compare a first signal transmitted by the first beacon to a second signal transmitted by the second beacon and determine an environmental characteristic of the tunnel based on the first signal and the second signal. In some embodiments, the controller may determine an operating parameter for the tunneling device based on the environmental characteristic.

Figure 1:
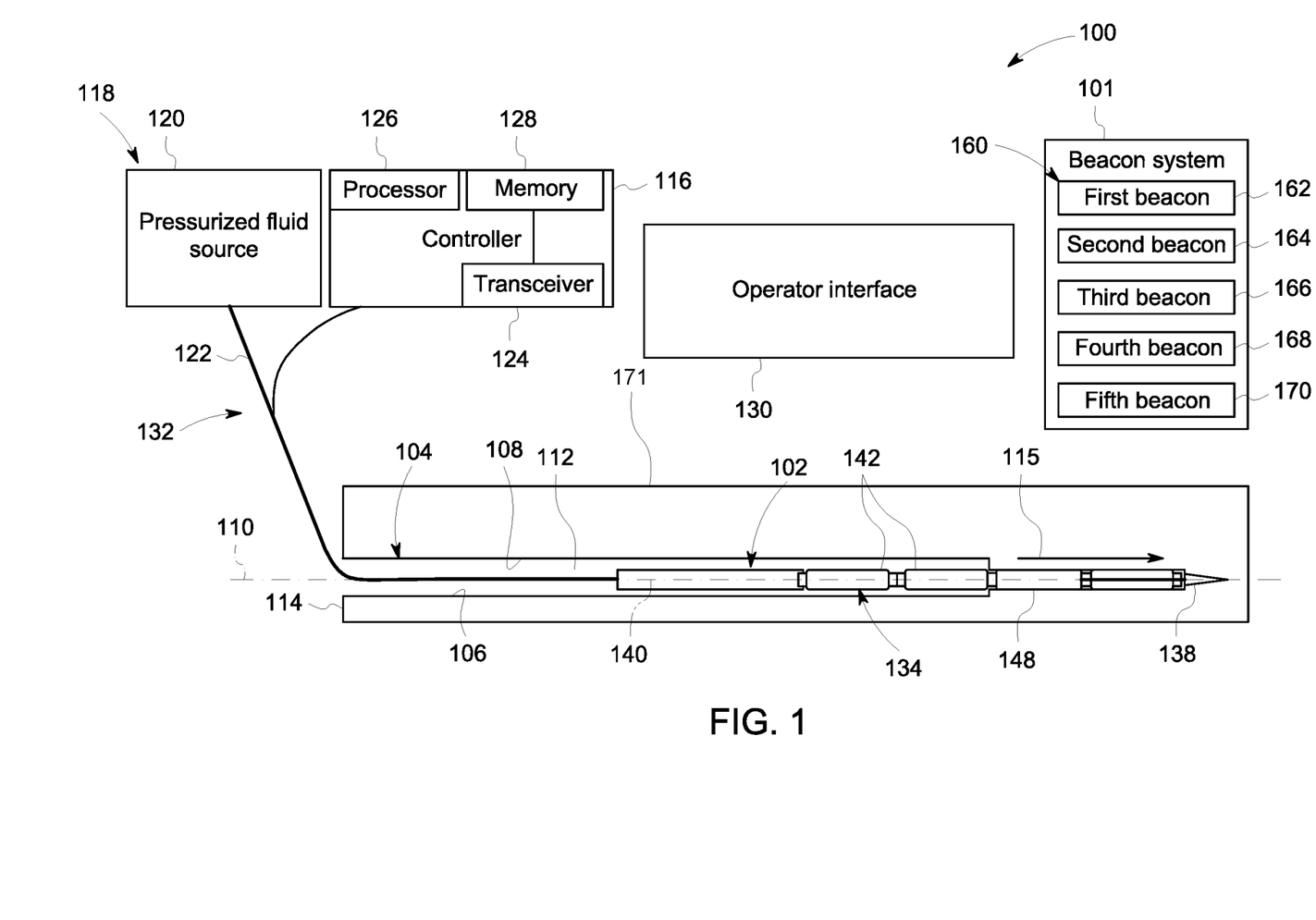
FIG. 1 is a schematic diagram of one embodiment of a system including a tunneling device and a beacon system.

FIG. 1 is a schematic diagram of a system 100 including a tunneling device 102 traveling underground, and a beacon system 101. For example, the tunneling device 102 is configured to travel through a tunnel 104 and/or displace material to form tunnel 104. Tunnel 104 includes a sidewall 106 having an interior surface 108 extending around a central axis 110 and defining interior cavity 112. Tunneling device 102 is configured to fit within interior cavity 112 and travel along the length of tunnel 104. Accordingly, tunneling device 102 facilitates construction of tunnel 104 and/or inspection and repair of tunnel 104. Moreover, tunneling device 102 is self-propelled, meaning that tunneling device 102 moves within interior cavity 112 without an external force acting on tunneling device 102.

During operation, for example, tunneling device 102 may be positioned at a surface 114 proximate an underground location and tunneling device 102 travels through surface 114 to form an opening into tunnel 104. In the illustrated embodiment, tunneling device 102 travels in a travel direction 115. In some embodiments, tunneling device 102 traverses transitions in tunnel 104 such as bends or size transitions. As tunneling device 102 travels through underground locations, tunneling device 102 is configured to form tunnel 104 and/or inspect and/or repair any portions of tunnel 104.

System 100 includes tunneling device 102, a controller 116 communicatively coupled to tunneling device 102, a fluid supply system 118, and beacon system 101. Fluid supply system 118 includes a pressurized fluid source 120 that is coupled to tunneling device 102 via a fluid line 122. Fluid supply system 118 is configured to regulate pressurized fluid that is delivered to/removed from tunneling device 102 for operation of tunneling device 102.

Beacon system 101 includes a plurality of beacons and acts as a distributed communication and sensing system in which each beacon 160 is capable of transmitting, receiving, and processing information. Information from each beacon 160 is shared with other beacons 160. For example, beacon system 101 is configured utilize distributed communication signals to provide capabilities for through transmission sensing, localization systems, and imaging systems utilizing beamforming techniques. In embodiments, beacon system 101 may include at least two of beacons 160. For example, in the illustrated embodiment beacon system 101 includes a first beacon 162, a second beacon 164, a third beacon 166, a fourth beacon 168, and a fifth beacon 170 that are communicatively coupled together.

In the example embodiment, first beacon 162 and second beacon 164 are coupled to body assembly 134 of tunneling device 102. For example, first beacon 162 and second beacon 164 are coupled to separate sections 142 of body assembly 134 at distinct locations and are spaced apart along longitudinal axis 140. In some embodiments, first beacon 162 and/or second beacon 164 are coupled to tether 132. First beacon 162 and second beacon 164 facilitate signals being sent and received at different underground locations as body assembly 134 travels through tunnel 104.

Third beacon 166, fourth beacon 168, and fifth beacon 170 are positioned outside of tunnel 104 in the example embodiment. For example, third beacon 166, fourth beacon 168, and fifth beacon 170 are positioned on a surface 171 above tunnel 104 at distinct locations and are spaced apart. First beacon 162, second beacon 164, third beacon 166, fourth beacon 168, and fifth beacon 170 are communicatively coupled to each other and are configured to communicate with each other as tunneling device 102 travels through tunnel 104. For example, first beacon 162, second beacon 164, third beacon 166, fourth beacon 168, and fifth beacon 170 are configured to communicate in a hand-off and/or following manner in which adjacent beacons 160 exchange signals until the next beacon 160 is in range. In some embodiments, third beacon 166, fourth beacon 168, and fifth beacon 170 are configured to move relative to surface 171 to track movement of tunneling device 102. In further embodiments, first beacon 162, second beacon 164, third beacon 166, fourth beacon 168, and fifth beacon 170 all communicate with each other simultaneously.

Beacon system 101 facilitates controller 116 determining environmental characteristics and operating parameters of system 100. For example, in some embodiments, beacon system 101 provides signals with an amplitude, phase, and/or position that are selected to create constructive interference at the target location and facilitate identification of environmental characteristics at the target location. In the example embodiment, controller 116 is configured to compare a first signal transmitted by one of first beacon 162, second beacon 164, third beacon 166, fourth beacon 168, and fifth beacon 170 to a second signal transmitted by another of first beacon 162, second beacon 164, third beacon 166, fourth beacon 168, and fifth beacon 170 and determine an environmental characteristic of tunnel 104 based on the first signal and the second signal. For example, controller 116 is configured to determine a characteristic of a material (e.g., a soil type, a hardness, a pressure, a moisture content, and/or any other characteristic), a presence of an obstacle 172 within the interior cavity 112, and/or any other environmental characteristic based on the comparison of signals. For example, controller 116 may determine a speed of a signal transmission through a material and can use the speed to identify a material based on a known relationship between the speed of the signal transmission and a material. In addition, controller 116 may localize the location of tunneling device 102 based on signals received from beacons 160 and the known locations of the beacons 160. Moreover, in some embodiments, controller 116 uses a beamforming technique to process signals by beacons 160 and determine operating parameters or environmental characteristics based on the signals. For example, beacon system 101 controls the phase and relative amplitude of signals from each beacon 160. Some signals are provided with constructive interference at a target location and others are provided with destructive interference. Beacons 160 receive the signals and interpret the signals based on the expected pattern of signals for the interference. Variations in the pattern may be associated with environmental characteristics or operating parameters.

In some embodiments, controller 116 evaluates transmitted and reflected waves (e.g., determines amplitude and phase) sent by each beacon 160. Controller 116 can determine characteristics of the media that the waves travel through because the presence of different media, including their material constitution, geometry, elastic modulus, dielectric properties, and/or acoustic properties have signatures that can be detected in the reflected and transmitted signals. Controller 116 can evaluate signals between beacons 160 that are different distances apart to negate the effect or decouple the attenuation of distance from the attenuation as a function for formation characteristics. In addition or alternatively, controller 116 may evaluate signals at a single frequency or at a multiplicity of frequencies where the signal interaction with the formation is a function of wavelength. Accordingly, controller 116 can allow for further characterization of the aggregates of the signals and their size distribution.

Controller 116 can evaluate the signals and/or determine characteristics utilizing a physics-based model, a machine learning algorithm, and/or a classification algorithm. For example, controller 116 can evaluate the signals based on one or more physics-based model including attenuation versus frequency, attenuation versus distance (between transmitter(s) and receiver(s)), reflection interaction at an interface, and/or any other physical parameters. In some embodiments, controller 116 includes a machine learning algorithm that is trained based on historical data and/or learns though feedback regarding how tunneling device 102 performs locomotion and tunneling functions and from measured data (historical and learning in situ). The machine learning algorithm can be trained to find patterns in signals sent and received by beacons 160. In further embodiments, controller 116 includes a classification algorithm that matches parameters from a physics based model and/or a machine learning algorithm to a set of soil conditions Suitably, the signals of system 100 are spread out in space (multiple beacons 160 that are stationary, moving, and/or attached to tunneling device 102) and time (time history of the signals) and system 100 uses both reflected as well as transmitted signals to provide information for characterization. As a result, system 100 facilitates dynamic and more robust characterization of the environment.

In some embodiments, controller 116 includes neural networks such as recurrent and/or convolutional neural networks to include time history of signals for characterization determinations. Time history can further be introduced by recognizing that as tunneling device 102 advances through an underground location, the relative position of tunneling device 102 changes with respect to beacons 160 such as beacons 160 on the surface. Accordingly, controller 116 can determine further information such as spatial characteristics by comparing each measurement with the time history. For example, at each position of tunneling device 102 within the underground location, a different signal path is traversed from beacon 160 on tunneling device 102 to beacon 160 on the surface. As a result, controller 116 can compare the characteristics of the different signals paths and generate a more complete "image" by stitching together the information from each of the signal paths. In contrast to traditional beamforming imaging, controller 116 steers the beam based on at least one of beacons 160 moving in physical location over time and controller 116 provides a more complete image by stitching the information from the moving beacon(s) 160.

In addition, controller 116 is configured to determine an operating parameter for tunneling device 102 based on the environmental characteristic and/or the signals sent by first beacon 162, second beacon 164, third beacon 166, fourth beacon 168, and fifth beacon 170. For example, controller 116 is configured to determine a location and/or orientation of tunneling device 102 relative to at least one of first beacon 162, second beacon 164, third beacon 166, fourth beacon 168, and fifth beacon 170 based on the comparison of the first signal and the second signal. Controller 116 provides a more accurate location of tunneling device 102 and can correct errors in locations of tunneling device 102 because controller 116 relies at least in part on signals from third beacon 166, fourth beacon 168, and fifth beacon 170 located on surface 171 for which a reliable location is known. In addition, controller 116 is configured to determine a path 174 for tunneling device 102 based on the comparison of the first signal and the second signal. For example, controller 116 determines path 174 to avoid obstacle 172 and/or a material identified based on the comparison of the first signal and the second signal. Moreover, beacon system 101 facilitates controller 116 making dynamic changes to path 174 and/or other operating parameters of tunneling device 102 because beacon system 101 provides robust imaging capabilities and enhanced detection of environmental characteristics in the underground location.

In addition, in the example embodiment, controller 116 is configured to provide instructions to move tunneling device 102 through tunnel 104 and/or to perform inspection or repair operations. Controller 116 includes a transceiver 124, a processor 126, and a memory 128. In some embodiments, controller 116 is positioned remotely from tunneling device 102, e.g., controller 116 is located at a base station that enables an operator on an exterior of tunnel 104 (shown in FIG. 1) to interact with tunneling device 102, and/or controller 116 can be at least partly incorporated into and located on board tunneling device 102. Transceiver 124 is communicatively coupled with tunneling device 102 and is configured to send information to and receive information from a transceiver of tunneling device 102. In some embodiments, transceiver 124 and a transceiver on tunneling device 102 communicate wirelessly. In alternative embodiments, tunneling device 102 and controller 116 communicate in any manner that enables system 100 to operate as described herein. For example, in some embodiments, controller 116 and tunneling device 102 exchange information through a wired link extending between tunneling device 102 and controller 116.

In addition, in some embodiments, controller 116 is at least partly located on board tunneling device 102 and is configured to execute instructions for controlling components of tunneling device 102, such as a maintenance device and drive systems. For example, controller 116 executes instructions that cause tunneling device 102 to move in a selected direction. In alternative embodiments, tunneling device 102 includes any controller that enables system 100 to operate as described herein. In some embodiments, controller 116 is not located on board tunneling device 102.

In some embodiments, tunneling device 102 includes one or more sensors and/or repair tools or pipe maintenance tools. For example, in some embodiments, tunneling device 102 includes a repair tool configured to repair interior surface 108, or an inspection tool configured to inspect a portion of the interior cavity 112.

Also, in the example embodiment, an operator interface 130 is configured to display information relating to the characteristics detected by tunneling device 102 for interpretation by the operator. Operator interface 130 may be included on a remote computing device (not shown) and/or may be incorporated with controller 116. Operator interface 130 may include, among other possibilities, a web browser and/or a client application. For example, in some embodiments, operator interface 130 displays images of interior surface 108 based on received signals. In some embodiments, operator interface 130 allows an operator to input and/or view information relating to control of tunneling device 102. In the example embodiment, operator interface 130 is configured to display information relating to the state of one or more of a maintenance device and a power source for interpretation by the operator. For example, state information may include a position of tunneling device 102 along a length of tunnel 104 (shown in FIG. 1). State information may also include, for example and without limitation, a charge status of a power source, a current draw for various drive and positioning motors, a pressure in one or more muscles, a diameter and/or length of one or more muscles, a state of one or more valves, and/or a flow rate in a channel of the fluidic circuit. In various embodiments, processor 126 translates operator inputs into steering, tool motion, camera control, sensor control, sensor motion, and/or any other commands and sends information via transceiver 124 to tunneling device 102 via a transceiver of tunneling device 102. In some embodiments, operator control of tunneling device 102 is in real time, such as through a joystick, a keyboard, a touchscreen, a remote motion capture system, and/or a wearable motion capture system or other interface having similar function. In other embodiments, tunneling device 102 is controlled partially or wholly according to a pre-programmed routine. In further embodiments, tunneling device 102 is at least partially automated. In some embodiments, an operator inputs information such as operation goals or conditional directions. In further embodiments, information, such as information received by controller 116 from tunneling device 102, control data sent to tunneling device 102, and additional operator inputs or state information (e.g., location, time, orientation, datalink quality, battery levels, repair material levels, failure mode indicators), is logged into memory 128.

Moreover, in the example embodiment, controller 116 is positioned on the exterior of tunnel 104 and communicates with tunneling device 102 positioned within interior cavity 112 of tunnel 104. For example, controller 116 is configured to send information to tunneling device 102 relating to the propulsion and/or steering of tunneling device 102 while tunneling device 102 is moving within interior cavity 112 of tunnel 104 through a wireless connection and/or a tether 132. In alternative embodiments, controller 116 and tunneling device 102 are configured in any manner that enables system 100 to operate as described herein.

In the example embodiment, tunneling device 102 includes a body assembly 134 and a tip 138. Also, in the example embodiment, body assembly 134 includes a force transmitter 148 coupled to and extending between section 142 and tip 138. Body assembly 134 of tunneling device 102 has a longitudinal axis 140. Body assembly 134 includes a plurality of sections 142 that extend along longitudinal axis 140. Sections 142 of body assembly 134 are modular and are detachably coupled together. Sections 142 of body assembly 134 are configured to move body assembly 134 through interior cavity 112 of tunnel 104. For example, sections 142 of body assembly 134 selectively expand and contract (e.g., widths and/or lengths of sections 142 selectively increase and/or decrease) to propel body assembly 134 through tunnel 104. For example, each section 142 of body assembly 134 is configured to switch from a first configuration having a first length and/or a first width to a second configuration having a second length and/or a second width. For example, sections 142 may each include pneumatic or hydraulic artificial muscles having elastomeric tubular membranes with fiber reinforcements and radial and axial actuators. The artificial muscles operate based on instructions from controller 116 to cooperatively propel body assembly 134 in desired directions. As a result, sections 142 of body assembly 134 are designed to provide an axial force and a radial force that propel body assembly 134 and tether 132 through underground locations. In the example embodiment, body assembly 134 and tether 132 do not require a separate linear actuator for propulsion. In some embodiments, body assembly 134 includes at least three sections 142 (e.g., a first section, a second section, and a third section) that are configured to cooperate and provide a crawling action to propel body assembly 134 through tunnel 104. In alternative embodiments, tunneling device 102 includes any body assembly 134 that enables tunneling device 102 to operate as described herein.

In the example embodiment, tip 138 is shaped to engage material and displace material when force transmitter 148 causes tip 138 to move. For example, tip 138 includes a tunnelling tool configured to displace material as tip 138 moves. In the example embodiment, tip 138 is a cone having a width and tapering to a point that is configured to engage the material. In alternative embodiments, tip 138 is any shape that enables tunneling device 102 to operate as described herein. For example, in some embodiments, tip 138 includes a blade, a helix, a sphere, and/or any other suitable shape.

In some embodiments, tip 138 includes at least one of a sensor and/or a repair tool, and tip 138 is configured to perform a maintenance operation within tunnel 104. For example, in some embodiments, tip 138 includes, without limitation, any of the following: an applicator, a drill, a grinder, a heater, a welding electrode, a sprayer, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, a maintenance device on tip 138 is used to provide information for steering tunneling device 102 and/or to perform a maintenance operation. In alternative embodiments, tunneling device 102 includes any tip 138 that enables tunneling device 102 to operate as described herein.

In addition, in some embodiments, tunneling device 102 includes a light source (not shown) configured to irradiate at least a portion of interior cavity 112 to facilitate visual or non-visual steering of tunneling device 102 and/or to allow a maintenance device to capture images, for example. The light source may be coupled to body assembly 134 and, in some embodiments, may be positionable relative to body assembly 134. In alternative embodiments, tunneling device 102 includes any light source that enables tunneling device 102 to operate as described herein.

In addition, in the example embodiment, pressurized fluid source 120 is coupled to one or more components of tunneling device 102 via fluid line 122. For example, sections 142 of body assembly 134 are configured to selectively switch configurations and propel body assembly 134 when pressurized fluid is delivered to or removed from sections 142 via fluid line 122. In alternative embodiments, system 100 includes any pressurized fluid source 120 that enables system 100 to operate as described herein. For example, in some embodiments, pressurized fluid source 120 includes separate fluid tanks and/or pumps that are coupled to and configured to regulate pressurized fluid in sections 142. In addition, in some embodiments, system 100 includes a plurality of fluid lines 122 coupled to body assembly 134.

Figure 2:
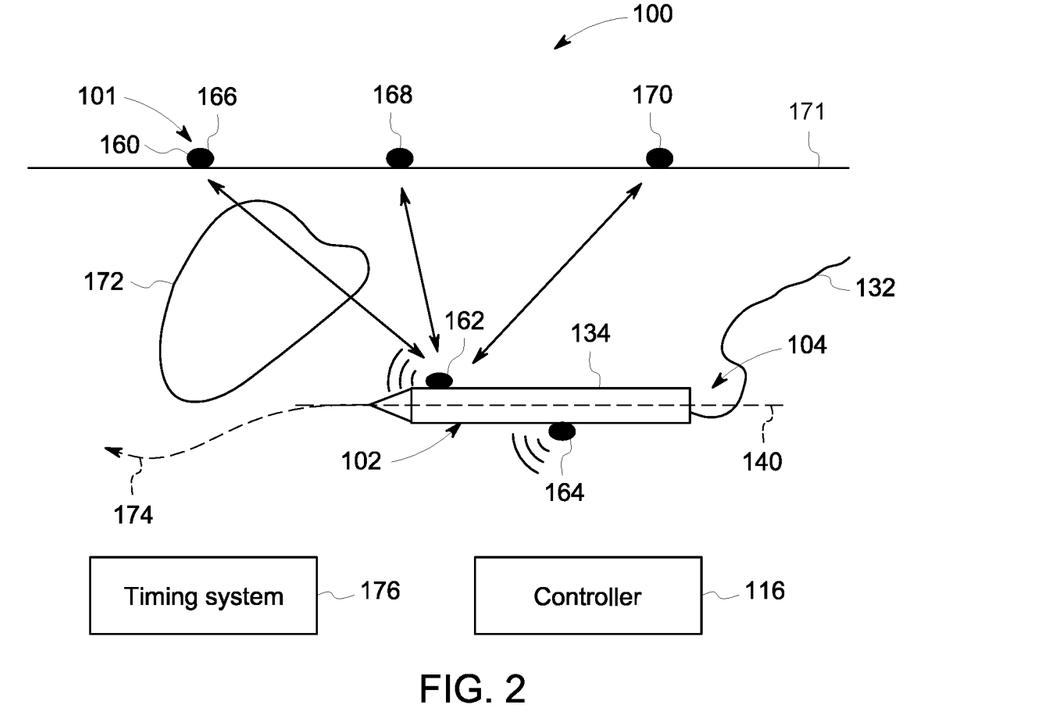
FIG. 2 is a schematic side view of a portion of the system shown in FIG. 1 illustrating communication between a plurality of beacons of the beacon system.

FIG. 2 is a schematic side view of a portion of system 100 illustrating communication between a plurality of beacons 160 of beacon system 101. For example, first beacon 162 and second beacon 164 are coupled to body assembly 134 of tunneling device 102, and third beacon 166, fourth beacon 168, and fifth beacon 170 are positioned outside of tunnel 104. For example, third beacon 166, fourth beacon 168, and fifth beacon 170 are positioned on a surface 171 above tunnel 104 at distinct locations and are spaced apart. Third beacon 166, fourth beacon 168, and fifth beacon 170 are programmed with a target signal depth that is intended to penetrate surface 171 and travel to the underground location. Third beacon 166, fourth beacon 168, and fifth beacon 170 may be configured to move along or above surface 171 and/or remain stationary relative to surface 171. In alternative embodiments, beacons 162, 164, 166, 168, 170 are arranged in any manner that enables beacon system 101 to function as described herein. For example, in some embodiments, at least one of third beacon 166, fourth beacon 168, and fifth beacon 170 is positioned within interior cavity 112 of tunnel 104. In further embodiments, at least one of third beacon 166, fourth beacon 168, and fifth beacon 170 is positioned between surface 171 and tunnel 104.

In the example embodiment, first beacon 162, second beacon 164, third beacon 166, fourth beacon 168, and fifth beacon 170 are configured to transmit and receive signals using a radio frequency communication system or an acoustic communication system. In addition, first beacon 162, second beacon 164, third beacon 166, fourth beacon 168, and fifth beacon 170 are each configured for two-way communication and are each configured to transmit and receive signals. In alternative embodiments, first beacon 162, second beacon 164, third beacon 166, fourth beacon 168, and fifth beacon 170 are configured to communicate in any manner that enables beacon system 101 to operate as described herein.

Also, in the example embodiment, a timing system 176 is coupled in communication with beacon system 101 and is configured to coordinate timing of signals sent by first beacon 162, second beacon 164, third beacon 166, fourth beacon 168, and fifth beacon 170. For example, in some embodiments, timing system 176 may be configured to record and store times when the signals are sent and received. Accordingly, timing system 176 and/or controller 116 is configured to determine a time difference between the transmissions of the first signal and the second signal based on the time information provided by timing system 176. In some embodiments, timing system 176 includes a radio frequency clock distribution that is used to coordinate timing of ultrasonic signals. In further embodiments, timing system 176 uses a timing signal transmitted by first beacon 162, second beacon 164, third beacon 166, fourth beacon 168, and/or fifth beacon 170 to coordinate timing of the signals sent and received by first beacon 162, second beacon 164, third beacon 166, fourth beacon 168, and fifth beacon 170. The timing signal includes time information that relates to the signals and facilitates identification of the signals based on the time information. Accordingly, timing system 176 facilitates each of first beacon 162, second beacon 164, third beacon 166, fourth beacon 168, and fifth beacon 170 transmitting and receiving signals simultaneously and facilitates controller 116 interpreting the signals. In the example embodiment, timing system 176 is incorporated into first beacon 162, second beacon 164, third beacon 166, fourth beacon 168, fifth beacon 170, and/or controller 116.

In some embodiments, timing system 176 utilizes a reference electromagnetic signal that is sent and received by beacons 160 for timekeeping. The electromagnetic signal has a faster speed than acoustic waves and, for embodiments utilizing acoustic signals, provides a time reference for the acoustic signals. In embodiments that utilize electromagnetic waves for signal transmission, timing system 176 can provide correction for any transmission delays based on known distances between static beacons 160 and approximate or estimated distances between beacons 160 and tunneling device 102. In some embodiments that utilize electromagnetic waves, the time errors can be ignored because of the transmission speed of the electromagnetic waves.

Figure 3:
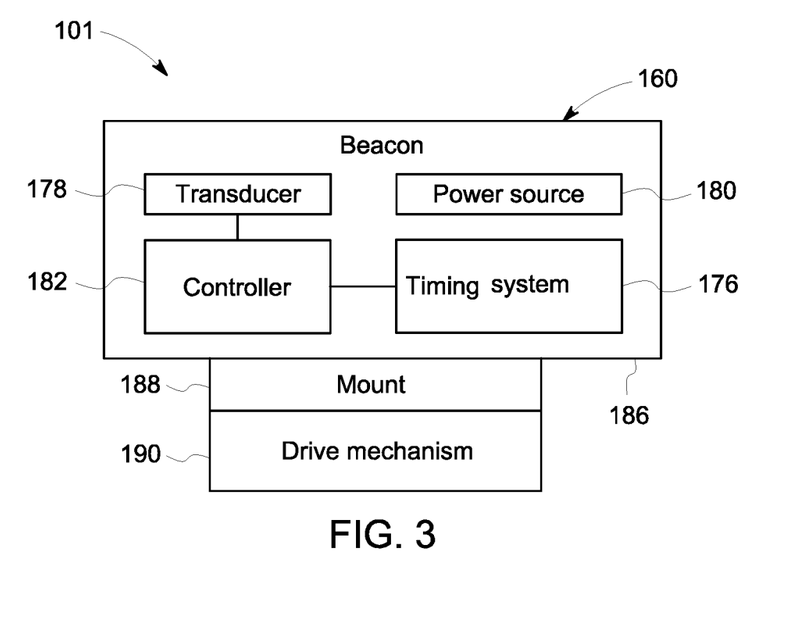
FIG. 3 is a schematic box diagram of one embodiment of a beacon including a transducer for use with the system shown in FIG. 1.

FIG. 3 is a schematic box diagram of one embodiment of an example beacon 160 of beacon system 101. Beacon 160 may be any of first beacon 162, second beacon 164, third beacon 166, fourth beacon 168, or fifth beacon 170 (shown in FIG. 2). In the example embodiment, beacon 160 includes a transducer 178, a power source 180, a controller 182, a timing system 176, and a housing 186. Housing 186 encloses and protects transducer 178, power source 180, controller 182, and timing system 176. In addition, housing 186 is constructed of a material that facilitates signals being transmitted therethrough. In alternative embodiments, beacon 160 includes any components that enables beacon 160 to function as described herein.

Beacon 160 may include any transducer 178 that enables beacon 160 to operate as described herein. In the example embodiment, transducer 178 is configured to transmit and receive signals when transducer 178 receives power from power source 180. For example, transducer 178 may be a two-way communication (pitch-catch) element including input and output components.

In the example embodiment, timing system 176 includes a clock and is configured to record and store times when the signals are transmitted or received by transducer 178. Accordingly, timing system 176 facilitates transducer 178 transmitting and receiving signals to and from a plurality of other transducers 178 and identifying the different signals. In the example embodiment, timing system 176 is a part of timing system 176 (shown in FIG. 2). In alternative embodiments, beacon 160 includes any timing system 176 that enables beacon 160 to function as described herein. For example, in some embodiments, timing system 176 is incorporated into controller 116 (shown in FIG. 2).

Controller 182 is communicatively coupled to transducer 178 and timing system 176. In addition, controller 182 receives power from power source 180. Controller 182 interprets signals received by transducer 178 and determines environmental characteristics and/or operating parameters based on the signals. For example, controller 182 identifies signals received from transducers 178 of different beacons 160 based on time information from timing system 176 and/or time information included in a timing signal. Controller 182 compares the signals and determines the environmental characteristics and/or operating parameters based on the comparison. In addition, beacon 160 provides improved processing of the signals because beacon 160 includes controller 182 that is directly connected to transducer 178 to provide instant processing and classification of signals within beacon 160 and not at a remote location. Moreover, beacon system 101 (shown in FIG. 2) may provide faster processing and classifications of signals because processing functions are distributed at each beacon 160 instead of occurring only at a central location.

Beacon 160 is coupled to a mount 188. Mount 188 is configured to support beacon 160 and attach beacon 160 to an object (e.g., body assembly 134 of tunneling device 102 shown in FIG. 2 or surface 171 shown in FIG. 2). In some embodiments, a drive mechanism 190 is coupled to mount 188 and/or beacon 160 and is configured to propel beacon 160 relative to a surface. For example, drive mechanism 190 may include a surface propulsion device and/or a flight propulsion system and be configured to propel beacon 160 along the surface and/or through the air. In alternative embodiments, mount 188 and/or drive mechanism 190 are omitted.

Referring to FIGS. 1-3, during operation, tunneling device 102 is positioned proximate surface 114 such that distal tip 138 engages material of the surface 114. Controller 116 provides instructions that cause tunneling device 102 to tunnel into surface 114 and through underground locations. In some embodiments, tip 138 displaces material to form interior cavity 112 when tunneling device 102 moves through the underground locations. Body assembly 134 propels tunneling device 102 through tunnel 104. For example, sections 142 of body assembly 134 are selectively switched between first and second configurations to propel body assembly 134 forward. Tip 138 engages new material to be displaced as body assembly 134 is propelled forward.

Beacons 160 of beacon system 101 transmit and receive signals as tunneling device 102 travels through underground locations. For example, first beacon 162 and second beacon 164 coupled to body assembly 134 of tunneling device 102 transmit signals to and receive signals from third beacon 166, fourth beacon 168, and fifth beacons 170 positioned on surface 171. Controller 116 determines environmental characteristics of tunnel 104 and/or the underground locations and/or operating parameters of tunneling device 102 based on the signals provided by beacon system 101.

Controller 116 provides instructions to direct tunneling device 102 through underground locations based at least in part on the determined environmental characteristics and/or the operating parameters. For example, controller 116 may generate instructions to cause tunneling device 102 to travel in a straight direction and/or to turn as body assembly 134 propels tunneling device 102. For example, controller 116 may send instructions that cause muscles in sections 142 of body assembly 134 to adjust and bend as sections 142 are selectively switched between configurations.

Figure 4:
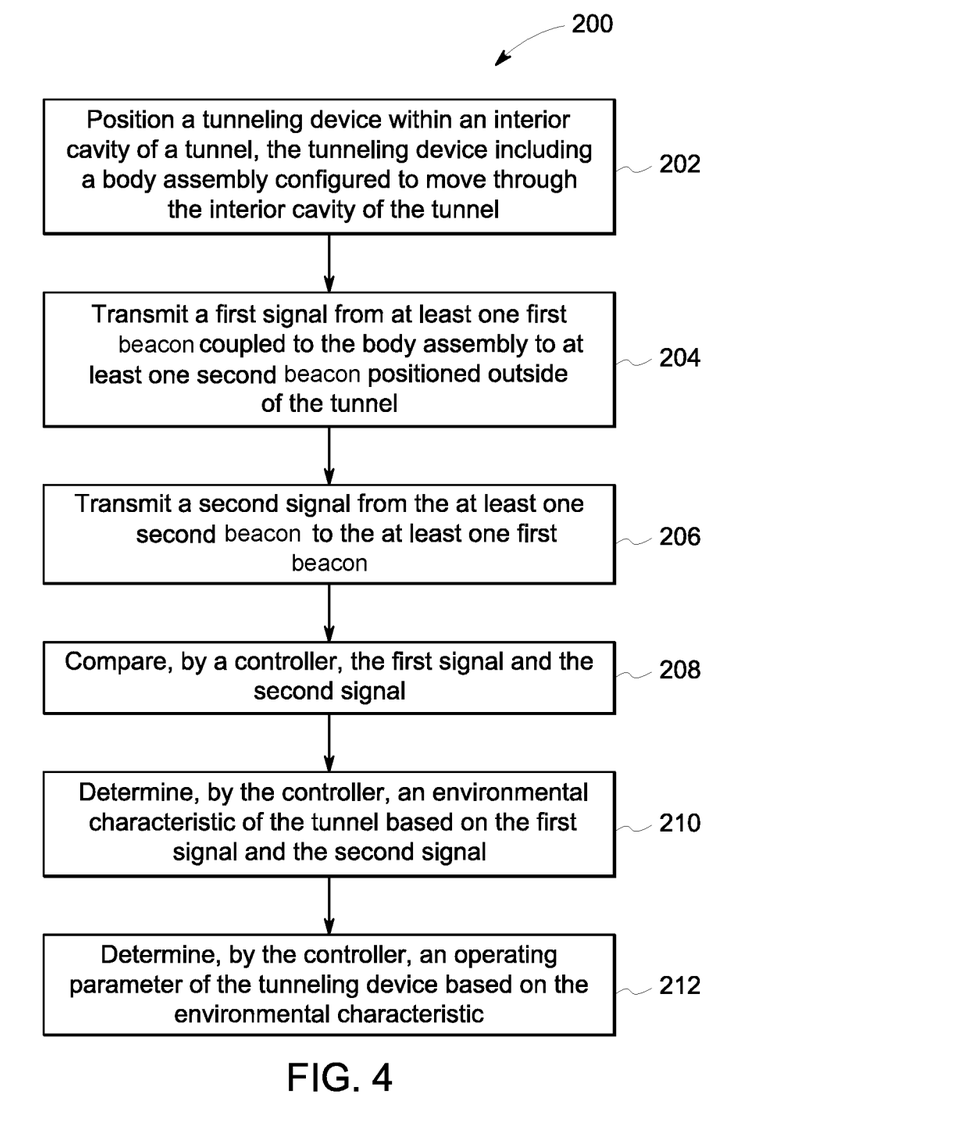
FIG. 4 is a flow chart of an example method of performing a maintenance operation using the system shown in FIG. 1.

FIG. 4 is a flow chart of an example method 200 of navigating tunnel 104 (shown in FIG. 1) using tunneling device 102 (shown in FIG. 1). In reference to FIGS. 1-4, method 200 includes positioning 202 tunneling device 102 within interior cavity 112 of tunnel 104. Body assembly 134 is configured to move through interior cavity 112. In some embodiments, body assembly 134 is propelled through interior cavity 112 using the plurality of sections 142 of body assembly 134. For example, pressurized fluid from pressurized fluid source 120 is delivered to or removed from sections 142 of body assembly 134 to sequentially adjust a length and/or a width of sections 142 and propel body assembly 134 through interior cavity 112.

In addition, method 200 includes transmitting 204 a first signal from at least one first transducer 178 (e.g., transducer 178 of first beacon 162 and/or second beacon 164) coupled to body assembly 134 to at least one second transducer 178 (e.g., transducer 178 of third beacon 166, fourth beacon 168, and/or fifth beacon 170) positioned outside of tunnel 104. Method 200 includes transmitting 206 a second signal from the at least one second transducer 178 to the at least one first transducer 178. In some embodiments, timing system 176 records and stores time information for the signals to facilitate interpretation of the signals. In further embodiments, timing system 176 provides timing signals including timing information to coordinate the timing of the signals. In some embodiments, transducers 178 send third, fourth, and/or fifth signals. The signals may include environmental characteristics, operating parameters, and/or time information.

Also, method 200 includes comparing 208, by controller 116, the first signal and the second signal, and determining 210, by controller 116, an environmental characteristic of tunnel 104 based on the first signal and the second signal. For example, controller 116 may determine a soil type, a hardness, a moisture content, a pressure, and/or any other characteristic based on the signals.

In addition, method 200 includes determining 212, by controller 116, an operating parameter of tunneling device 102 based on the environmental characteristic. For example, in some embodiments, controller 116 determines path 174 for tunneling device 102 and directs movement of tunneling device 102 along path 174 based on the signals from beacon system 101. For example, in some embodiments, controller 116 identifies obstacle 172 based on signals of beacon system 101 and directs movement of tunneling device 102 to avoid obstacle 172. In addition, controller 116 may adjust operation of tunneling device 102 based on the type or characteristic of the material that is identified from the comparison of the signals of beacon system 101.

In the example embodiment, any steps of method 200 are repeated any number of times required for tunneling device 102 to travel a desired distance through tunnel 104 and/or to displace material and form a desired length of tunnel 104.

An example technical effect of the methods, systems, and apparatus described herein includes at least one of: (a) reducing the time to construct tunnels through underground locations; (b) enabling tunneling operations and/or inspection and repair of an interior cavity of a tunnel at greater distances from an access opening; (c) increasing the information that is available during tunneling operations; (d) reducing the power requirements for tunneling devices during tunneling operations; (e) improving control and steering of tunneling devices during tunneling operation; and (f) increasing characterization information available for underground locations that is available during tunneling operations.

Example embodiments of systems and methods for use in tunneling operations are described above in detail. The methods and systems are not limited to the specific embodiments described herein, but rather, components of systems and/or steps of the methods may be utilized independently and separately from other components and/or steps described herein. For example, the method may also be used in combination with other components, and are not limited to practice only with tunnels as described herein. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a tunneling device comprising a body assembly comprising a plurality of separate sections and configured to move through an interior cavity of a tunnel;
   a distributed communication and sensing system comprising:
     at least a first beacon and a second beacon coupled to the separate sections of the body assembly at spaced apart locations;
     at least a third beacon and a fourth beacon positioned outside of the tunnel at distinct locations, and wherein the first beacon, second beacon, third beacon and fourth beacon are communicatively coupled to each other; and
   a controller operatively coupled to the tunneling device and to the beacons of the distributed communication and sensing system, the controller configured to:
     compare a first signal transmitted by at least one of the first beacon and the second beacon to a second signal transmitted by at least one of the third beacon and the fourth beacon;
     determine an environmental characteristic of the tunnel based on the first signal and the second signal; and
     determine an operating parameter for said tunneling device based on the environmental characteristic.

2. The system in accordance with claim 1, wherein said controller is further configured to determine a location of said tunneling device relative to at least one of the third beacon and the fourth beacon based on the comparison of the first signal and the second signal, and determine a path for said tunneling device based on the determined location.

3. The system in accordance with claim 1, wherein the first signal and the second signal are transmitted using a radio frequency communication system or an acoustic communication system.

4. The system in accordance with claim 1, further comprising a timing system coupled in communication with at least one of the first beacon and the second beacon, wherein said timing system is configured to coordinate timing of the first signal and the second signal.

5. The system in accordance with claim 1, wherein at least one of said first beacon, the second beacon, the third beacon and the fourth beacon is configured to transmit a third signal, wherein the third signal includes time information to coordinate timing of the first signal and the second signal.

6. The system in accordance with claim 1, wherein at least one of the third beacon and the fourth beacon is configured to move along a surface and relative to the interior cavity of the tunnel.

7. The system in accordance with claim 1, wherein the environmental characteristic includes a soil type, and wherein said controller is configured to determine a path for the tunneling device based on the soil type.

8. The system in accordance with claim 1, wherein said controller is configured to determine the environmental characteristic using a beamforming technique.

9. The system in accordance with claim 1, wherein said controller is configured to determine the environmental characteristic based on a speed of transmission of at least one of the first signal and the second signal.

10. The system in accordance with claim 1, wherein said controller is configured to determine a location of said tunneling device based on the second signal and a location of at least one of the third beacon and the fourth beacon.

11. A tunneling device comprising:
a body assembly comprising a plurality of separate sections and configured to move through an interior cavity of a tunnel;
at least a first beacon and a second beacon coupled to separate sections of the body assembly at spaced apart locations, and communicatively coupled to at least a third beacon and a fourth beacon positioned outside of the tunnel at distinct locations; and
a controller communicatively coupled to the first beacon, second beacon, third beacon and fourth beacon, and configured to:
compare a first signal transmitted by at least one of the first beacon and the second beacon to a second signal transmitted by at least one of the third beacon and the fourth beacon;
determine an environmental characteristic of the tunnel based on the first signal and the second signal; and
determine an operating parameter for said tunneling device based on the environmental characteristic.

12. The tunneling device in accordance with claim 11, wherein said controller is further configured to determine a location of said tunneling device relative to at least one of the third beacon and the fourth beacon based on the comparison of the first signal and the second signal, and determine a path for said tunneling device based on the determined location.

13. The tunneling device in accordance with claim 11, further comprising a timing system coupled in communication with at least one of the first beacon and the second beacon, wherein said timing system is configured to coordinate timing of the first signal and the second signal.

14. A method for detecting operating parameters and/or environmental characteristics of an underground location comprising:
positioning a tunneling device within an interior cavity of a tunnel, the tunneling device including a body assembly comprising a plurality of separate sections and configured to move through the interior cavity of the tunnel;
transmitting a first signal from at least one of a first beacon and a second beacon coupled to the separate sections of the body assembly at spaced apart locations to at least one of a third beacon and a fourth beacon positioned at distinct locations outside of the tunnel;
transmitting a second signal from at least one of the third beacon and the fourth beacon to at least one of the first beacon and the second beacon;
comparing, by a controller, the first signal to the second signal;
determining, by the controller, an environmental characteristic of the tunnel based on the first signal and the second signal; and
determining, by the controller, an operating parameter for the tunneling device based on the environmental characteristic.

15. The method in accordance with claim 14, further comprising:
determining a location of the tunneling device relative to at least one of the third beacon and the fourth beacon based on the comparison of the first signal and the second signal; and
determining a path for the tunneling device based on the determined location of the tunneling device.

16. The method in accordance with claim 14, further comprising determining a time difference between the transmissions of the first signal and the second signal.

17. The method in accordance with claim 14, wherein determining, by the controller, the environmental characteristic of the tunnel based on the first signal and the second signal comprises determining a soil type, and wherein determining, by the controller, the operating parameter of the tunneling device based on the environmental characteristic comprises determining a path for the tunneling device based on the soil type.

* * * * *